United States Patent
Heer et al.

[11] Patent Number: 5,799,769
[45] Date of Patent: Sep. 1, 1998

[54] CODABLE ADAPTER FOR USE WITH A HANGING CONVEYOR SYSTEM

[75] Inventors: Werner Heer, Oerlinghausen; Rainer Brannahl, Bielefeld; Thomas Zahn, Bielefeld; Paul Janzen, Bielefeld, all of Germany

[73] Assignee: Dürkopp Adler AG, Bielefeld, Germany

[21] Appl. No.: 584,620

[22] Filed: Jan. 11, 1996

[30] Foreign Application Priority Data

Jan. 11, 1995 [DE] Germany .............. 195 00 612.7

[51] Int. Cl.⁶ .................................................. B65G 37/00
[52] U.S. Cl. ................... 198/349; 198/465.4; 198/687.1
[58] Field of Search ...................... 198/687.1, 465.4, 198/349, 350, 352–354, 680, 486.1

[56] References Cited

U.S. PATENT DOCUMENTS

| | | | |
|---|---|---|---|
| 2,778,504 | 1/1957 | Byrne | 211/1.56 |
| 2,868,354 | 1/1959 | Harrison | 198/486.1 |
| 3,006,468 | 10/1961 | Blake | 198/680 |
| 3,029,952 | 4/1962 | Bagdon et al. | 211/117 |
| 3,124,236 | 3/1964 | Gerisch | 198/680 |
| 3,208,600 | 9/1965 | Bignall et al. | 198/465.4 |
| 3,399,768 | 9/1968 | Holmberg et al. | 198/486.1 |
| 3,422,950 | 1/1969 | Bachmann | 198/680 |
| 3,454,148 | 7/1969 | Harrison | 198/465.4 |
| 3,499,518 | 3/1970 | Goodpaster | 198/465.4 |
| 3,557,935 | 1/1971 | Gerisch | 198/465.4 |
| 3,785,474 | 1/1974 | Nakamoto | 198/355 |
| 4,372,218 | 2/1983 | Ostlund | 198/352 |
| 4,883,165 | 11/1989 | Neiman | 198/682 |
| 5,072,822 | 12/1991 | Smith | 198/465.4 |

FOREIGN PATENT DOCUMENTS

| | | | |
|---|---|---|---|
| 582047A | 2/1994 | European Pat. Off. | 198/465.4 |
| 896509 | 11/1953 | Germany . | |
| 7320796 | 9/1973 | Germany . | |
| 988788 | 4/1965 | United Kingdom | 198/465.4 |

*Primary Examiner*—Joseph E. Valenza
*Assistant Examiner*—Khoi M. Tran
*Attorney, Agent, or Firm*—Ostrolenk, Faber, Gerb & Soffen, LLP

[57] ABSTRACT

An adapter for use with a hanging conveyor system in which articles hanging on hangers and particularly articles of clothing, are transported for sorting or ordering by means of a conveyor along a transport path. The adapter is codable with data concerning the articles. The adapter is insertable between each article hanger provided with a hanger hook and the conveyor means. The adapter has a hook-shaped head region and a receiving region located below the head region. The receiving region has at least one section having a U-shaped cross section formed by an upward-extending arm. The receiving region contacts the hanger hook over such a region that the hanger hook, once inserted, will not twist in the receiving region. In a preferred embodiment, the receiving region is made up of two sections that are adjacent to each other, forming between them an intermediate space. Methods and arrangements for automatically loading hangers into and unloading hangers from the adapters also are provided.

33 Claims, 7 Drawing Sheets

CODABLE ADAPTER FOR USE WITH A HANGING CONVEYOR SYSTEM

BACKGROUND OF THE INVENTION

1. Field of the Invention

The present invention relates to an adapter for use with a hanging conveyor system in which articles, particularly articles of clothing, hanging on hangers are transported for sorting or ordering by means of a conveyor along a transport path. The adapter is codable with data concerning the article, and can be inserted loosely between each article hanger provided with a hanger hook and the conveyor.

2. Description of the Related Art

Hanging conveyor systems for sorting or ordered conveyance of articles of clothing are known. By means of suitable switches present in the transport path, the articles of clothing are moved out of the main path into storage and sorting paths and, when required, returned via appropriate entrance points back into the main path.

From Federal Republic of Germany 92 09 079.6 U1 and Federal Republic of Germany 41 26 615 A1, codable adapter hangers are known which are used to identify and separate certain groups of articles of clothing for sorting or ordering within the hanging conveyor system.

The known adapters are of very complex construction. Accordingly, the known adapters are rather complicated to handle, and are both difficult and expensive to make. Furthermore, clothes hangers hung in the adapters are not protected from carrying out swinging movements. It is therefore possible that, during transport, the clothes hangers will twist and/or swing, resulting in a larger amount of space being taken up by the moving clothes articles. In addition, tangling can occur amongst the carriers of the articles being conveyed. Further, the clothes hangers can drop out of the adapter, which can lead to the transported articles of clothing becoming damaged or soiled.

Federal Republic of Germany 39 17 630 A1 discloses a device for transporting articles of clothing on hangers by a handling device. The hangers are suspended by their hooks in a carriage which is guided in a form-locked manner in the guide rail. The carriage is part of the conveyor system and cannot be inserted when needed between the conveyor and the hanger.

U.S. Pat. No. 3,029,952 discloses a carrying device by which individual smaller articles can be transported in a hanging conveyor system through various cleaning, painting, and drying stations. This hanging device has a hook-shaped head region which is suspended from the roller chain of the hanging conveyor system. A plurality of receiving ledges which can be hung in the carrier device can receive the individual objects such that they are hung by hooks into the receiving ledges. This device is not suitable for sorting or ordered transport of articles of clothing.

In view of the various problems in the prior art, including those noted above, the need exists for an adapter for conveying hanging articles in which swinging movements of the hanger hook are excluded and the adapter can be manufactured easily and at low expense. Furthermore, the need exists for an adapter capable of being automatically loaded and unloaded.

SUMMARY OF THE INVENTION

The present invention overcomes the problems noted above by providing an adapter having a hook-shaped head region and a receiving region which lies below the head region. The receiving region is formed by at least one section having a U-shaped cross section formed by an upward-extending arm. The hook of a hanger contacts the adapter such that it can be inserted without twisting into the receiving region.

As a result, the receiving region of the adapter can be developed as a plastic molding, and the hook-shaped head region can correspond to the shape of an ordinary clothes hanger hook. Such an adapter is particularly light and can also be used in traditional conveyor systems into which, conventionally, the hangers of the articles of clothing were introduced directly In a preferred embodiment, the receiving region of the adapter includes two sections, each section having a U-shaped cross section formed by a downward extension and an upward-extending arm. The two sections are spaced apart such that an opening is created between them in the receiving region of the adapter. The sections are spaced apart such that the hanger will not twist during loading and transport, the hanger hook being contacted and held statically at two points on the adapter.

Each adapter can be provided with a code element containing coded information. The code element can be replaceable, such that inexpensive bar codes can be used which contain required data as to the nature of the article being conveyed and/or the end point of the sorting path, for example.

Methods of and arrangements for loading and unloading the adapters with hangers according to the present invention include providing a feed rod and/or a removal rod arranged in the loading and removing regions, respectively, of the hanging conveyor system. The respective rod is positioned such that the adapter can be transported along the length of the rod. The adapter moves over the rod such that the rod is positioned in the opening between the two sections, and free ends of the adapter sections are located below the rod.

For automatic loading according to an embodiment of the present invention, the hanger which is to be hung on the adapter rests via its hanger hook on a feed rod or moves along it at a slow speed. The adapter is moved above the feed rod from the rear of and up to the hanger hook. The sections of the adapter lying alongside of each other receive the guide rod between them and extend down on either side of the guide rod such that their upward-extending arms, which face in the direction of the hanger hook, are located below the upper curvature of the hanger hook. The extensions of the adapter strike against the upper curvature of the hanger hook and push the hanger on its hanger hook up to the end of the feed rod, where the hanger hook then drops into the receiving region as a result of gravity.

For automatic removal of a hanger or hanger hook from an adapter according to an embodiment of the present invention, the adapter with the hanger hung from it is guided over a removal rod that rises in the transport direction such that the rod is between the two adapter sections. The adapter is guided along the removal rod, while retaining its horizontal position, until the rod lifts the hanger hook above the ends of the upward-extending arms in the transport direction, whereby the contact between hanger hook and receiving region is interrupted. A descending path, which preferably adjoins the ascending path of the removal rod, guides the hanger hook away from the adapter as a result of gravity.

By the feeding and removal methods of the present invention, sorting and/or ordered transport of articles of clothing is further streamlined so that passage times within the conveying system are shortened, and the percentage of errors is reduced. Both the feed rod and the removal rod can be developed relatively simply and inexpensively.

BRIEF DESCRIPTION OF THE DRAWINGS

The invention will be explained in further detail with reference to the drawings and several embodiments. In the drawings.

DETAILED DESCRIPTION OF THE PREFERRED EMBODIMENTS

Figure 1:
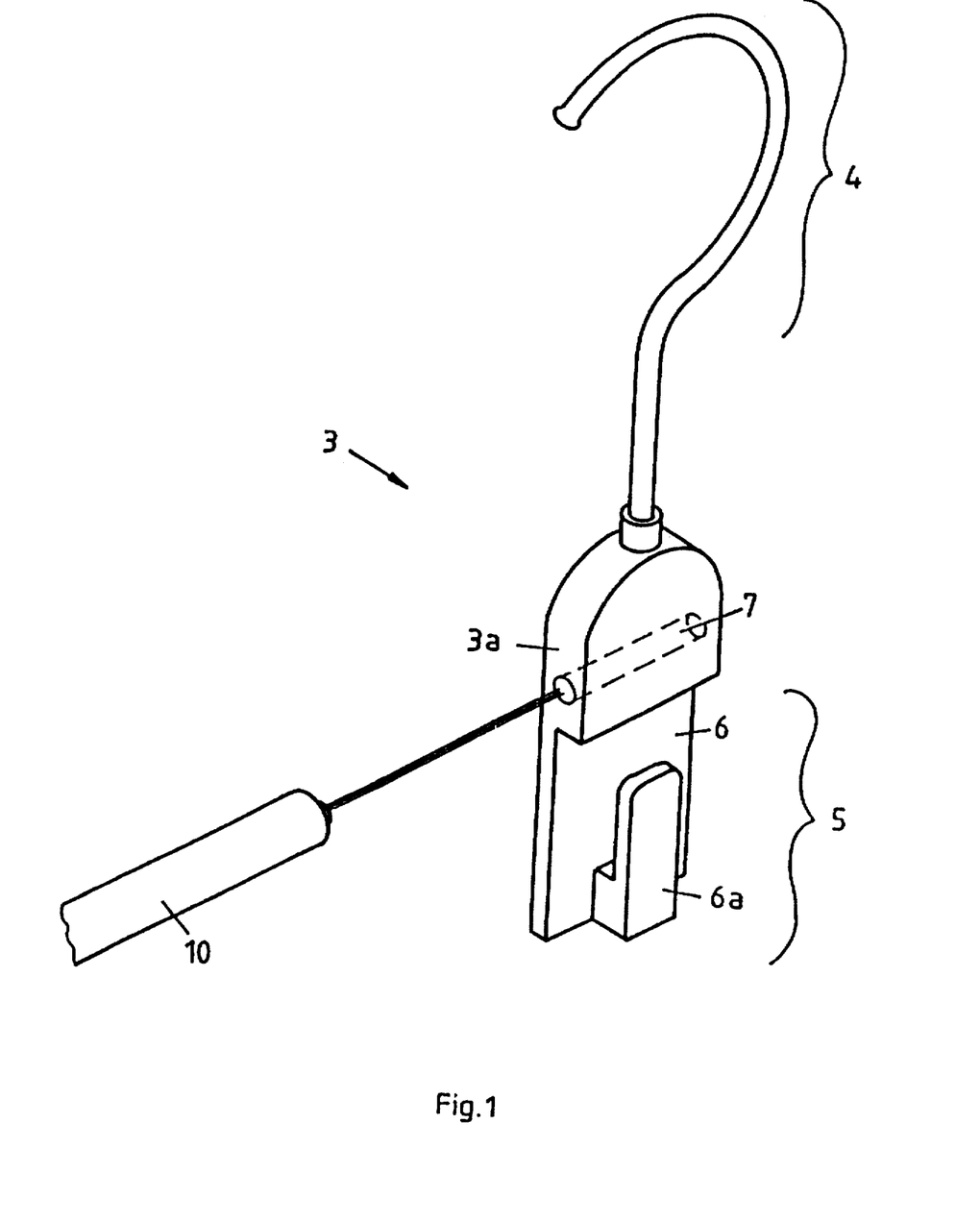
FIG. 1 shows a first embodiment of an adapter in accordance with the present invention, seen in perspective.
Figure 2:
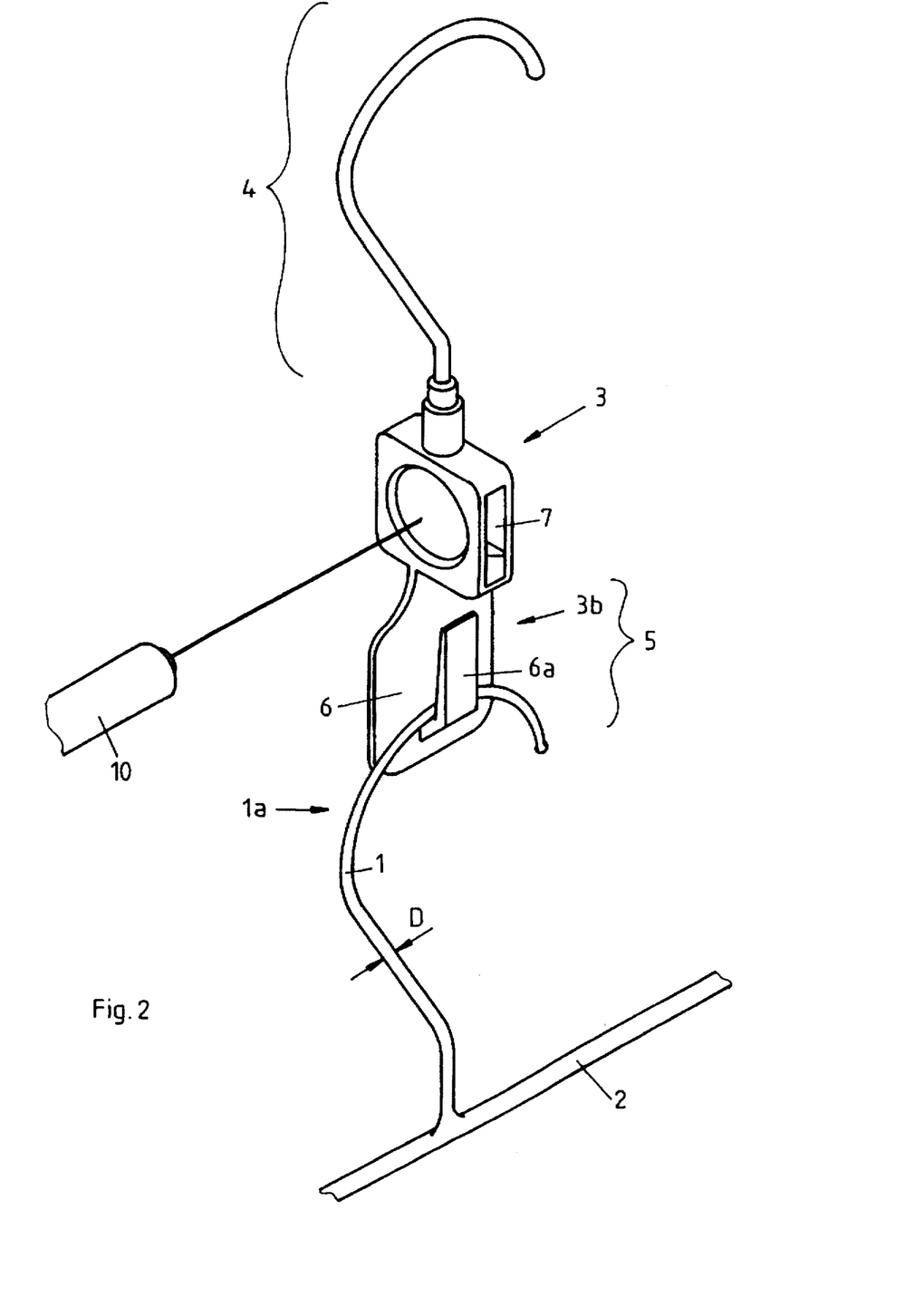
FIG. 2 shows a second embodiment of an adapter in accordance with the present invention, seen in perspective with a hanger suspended therefrom.

Referring initially to FIGS. 1 and 2, an adapter 3 consists of a hook-shaped head region 4 and, below it, a receiving region 5 for a clothes hanger 2 or hanger hook 1 to be hung therein. The head region 4 preferably has the shape of an ordinary commercial clothes hanger hook by which it can be hung on a conveyor in a conveyor system, not shown here, and is set in a base body 3a on which the receiving region 5 is also formed.

Between the head region 4 and the receiving region 5 there is a code carrier 7 connected to the adapter 3, which code carrier can be scanned in known manner by a code reader 10. Code carrier 7 can, for instance, be provided with a bar code, a chip, or a transponder. Code reader 10 can, for instance, have a scanning laser beam. The code carrier 7 can be connected either replaceably or permanently to adapter 3.

Figures 3, 4:
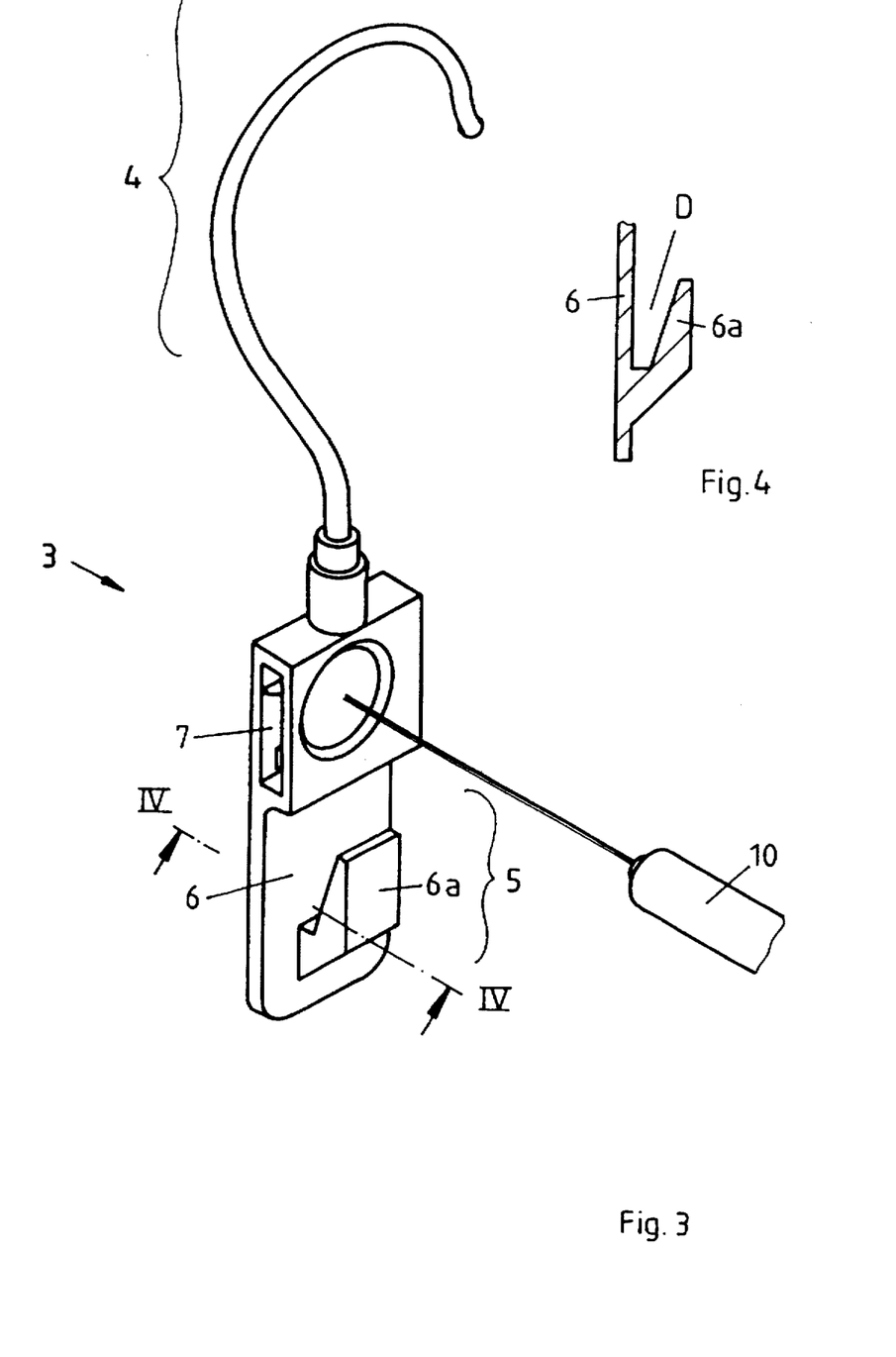
FIG. 3 shows another embodiment of an adapter in accordance with the present invention.
FIG. 4 is a partial section along the line IV—IV of FIG. 3.

In the embodiments shown in FIGS. 1 to 3, the receiving region 5 is formed by a downward extension 6 which preferably is narrower than the base body 3a and on which an upward-extending arm 6a protrudes, so that the receiving region 5 has a U-shaped cross section formed by extension 6 and arm 6a. The space between extension 6 and arm 6a corresponds preferably to the diameter D of the wire of hanger hook 1 which is to be hung therein, as shown in greater detail in FIG. 4.

Figure 5:
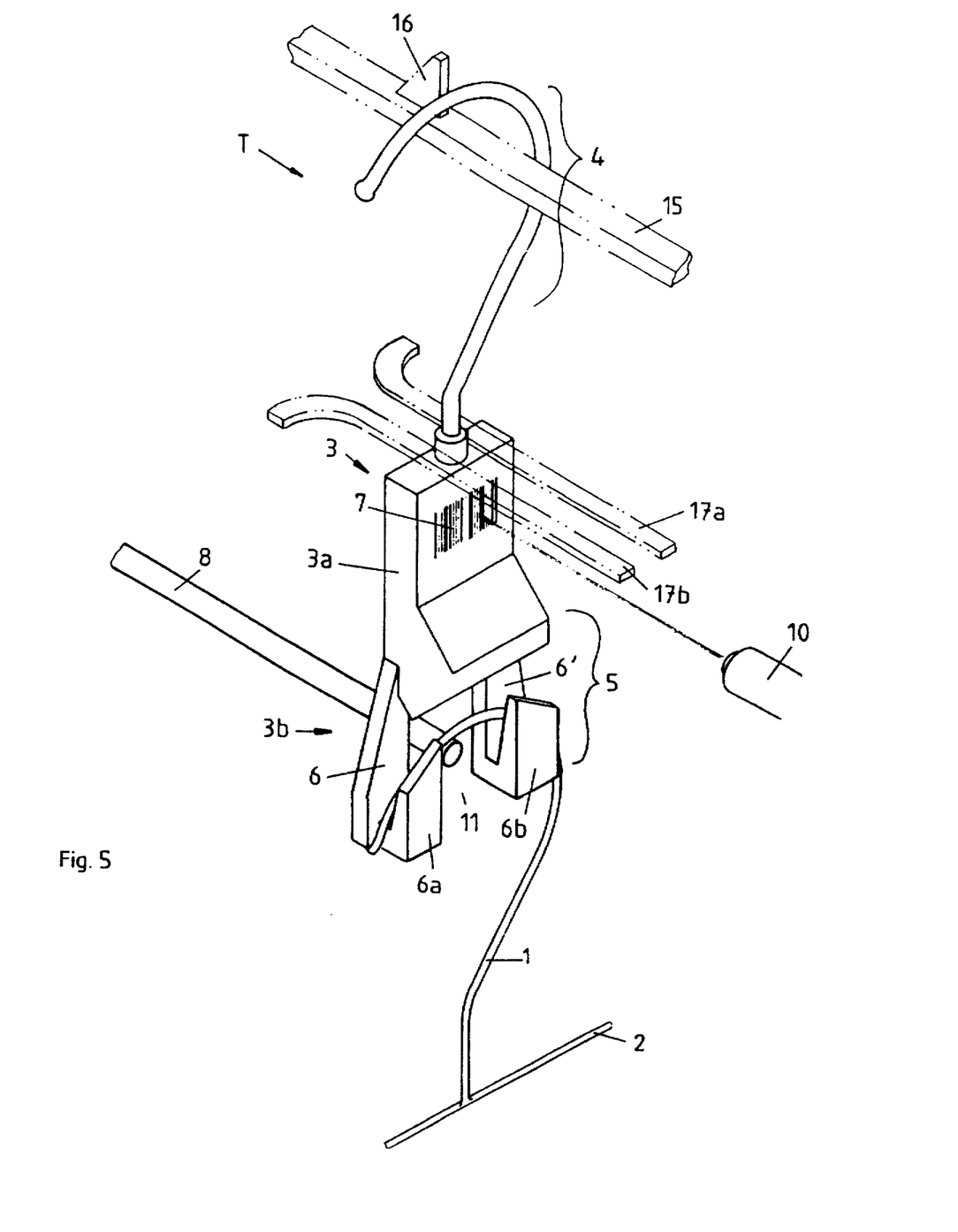
FIG. 5 shows an adapter suitable for automatic loading and removal from a conveyor system, according to an embodiment of the present invention, shown in the loading phase.
Figure 6:
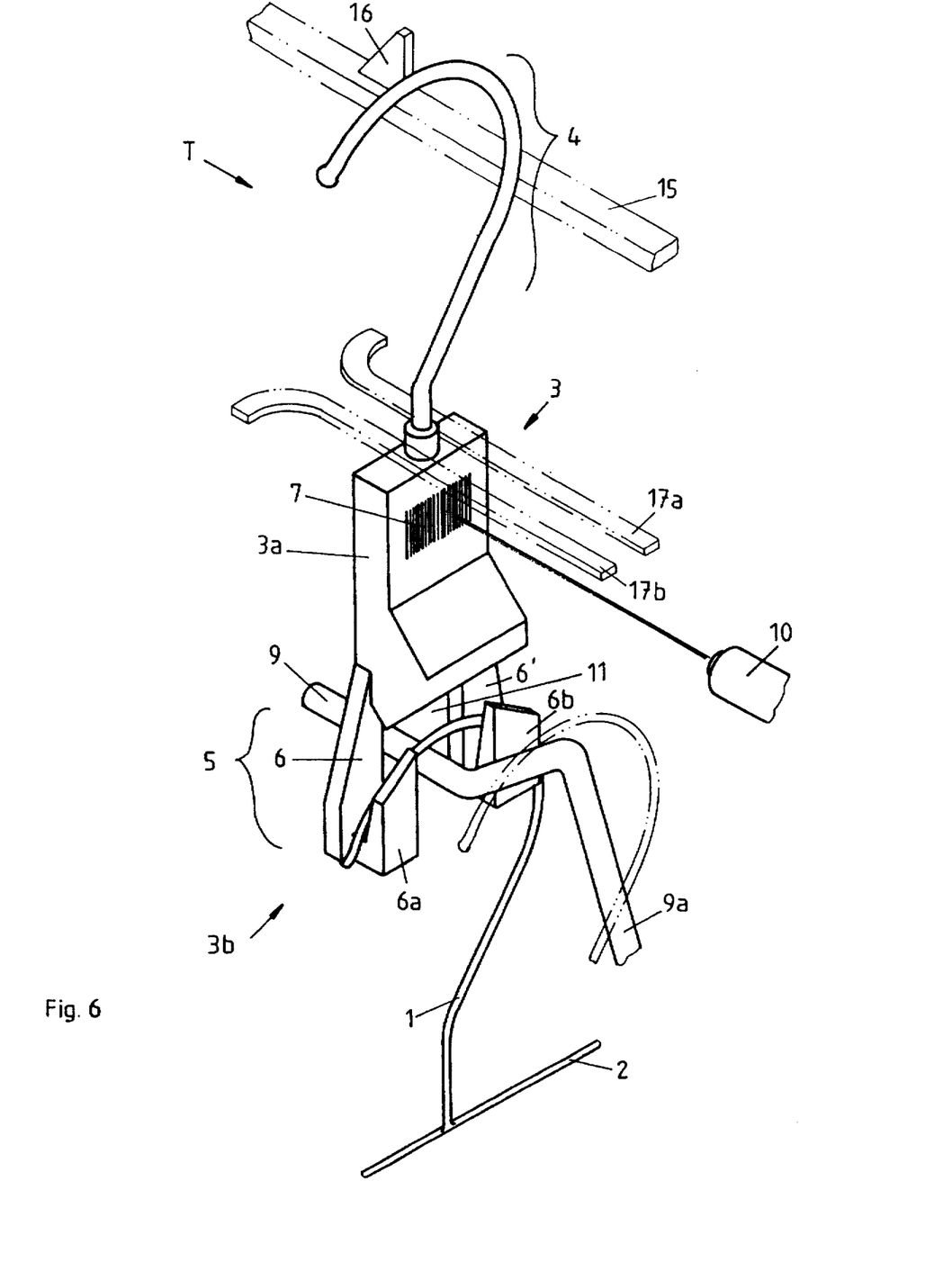
FIG. 6 shows the adapter in accordance with FIG. 5, in the unloading phase.

In the embodiment of the adapter 3 shown in FIGS. 5 and 6, the base body 3a extends downward into two sections 3b which lie parallel to and alongside each other. Between the two sections 3b is an intermediate space 11. The two sections 3b also have U-shaped cross sections formed by two parallel sets of extensions 6, 6' and arms 6a, 6b. The distance between the extensions 6 and 6' and the arms 6a and 6b, respectively, preferably corresponds again to the diameter D of the wire of the hanger hook 1 which is to be received.

Referring to FIG. 5, a method and arrangement for automatic loading of the adapters according to the present invention will be described. The hook 1 of the hanger 2 which is to be hung is placed on feed rod 8, or moved along it sliding at low speed. From the rear of the hanger, the adapter 3 is moved in a transport direction T long the feed rod to the hanger hook 1, the extension and arm pairs 6, 6a and 6', 6b receiving the feed rod 8 in the intermediate space 11 between them. The adapter 3 is guided in a horizontal position such that the arms 6a, 6b move in a plane below the feed rod 8. The adapter 3, by means of extensions 6, 6', strikes the upper region of the hanger hook 1 and pushes the hanger 2 along the feed rod 8 to the end thereof, at which point the hanger hook 1 slides off the end of the guide rod. The hanger falls due to gravity into the receiving region 5, hooked between extensions 6, 6' and arms 6a, 6b.

Referring to FIG. 6, a method and arrangement for hanger removal from the adapter according to an embodiment of the present invention will be described. The adapter 3 with the hanger 2 hanging from it is moved along a removal rod 9 which initially rises in the direction of transport T, the horizontal position of the adapter 3 remaining constant. Consequently, the ascending removal rod 9 eventually lifts the hanger hook 1 out above the ends of arms 6a, 6b and detaches it from the receiving region 5. By the upper ends of the arms 6a, 6b which are beveled toward the outer sides, the hanger hook 1 slides, in transport direction T, out of the receiving region 5 and is pushed forward by the extensions 6, 6' along removal rod 9.

A descending region 9a adjoins the ascending region of the removal rod. The hanger hooks 1 slide down on this downward-descending path 9a, while the adapter 3 continues in the transport direction T.

Figure 7:
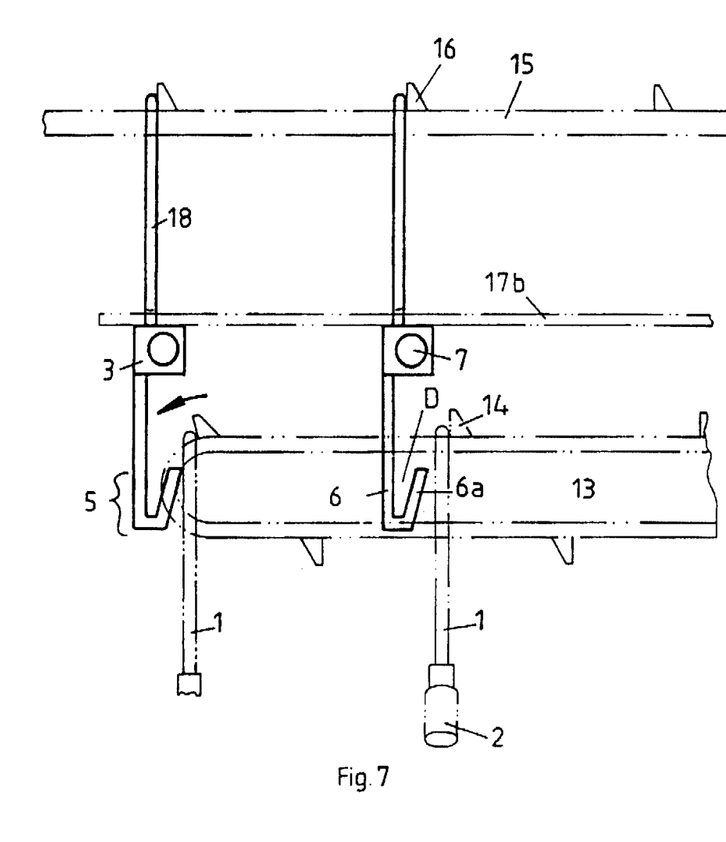
FIG. 7 is a diagram showing the loading of another adapter according to an embodiment of the present invention.
Figure 8:
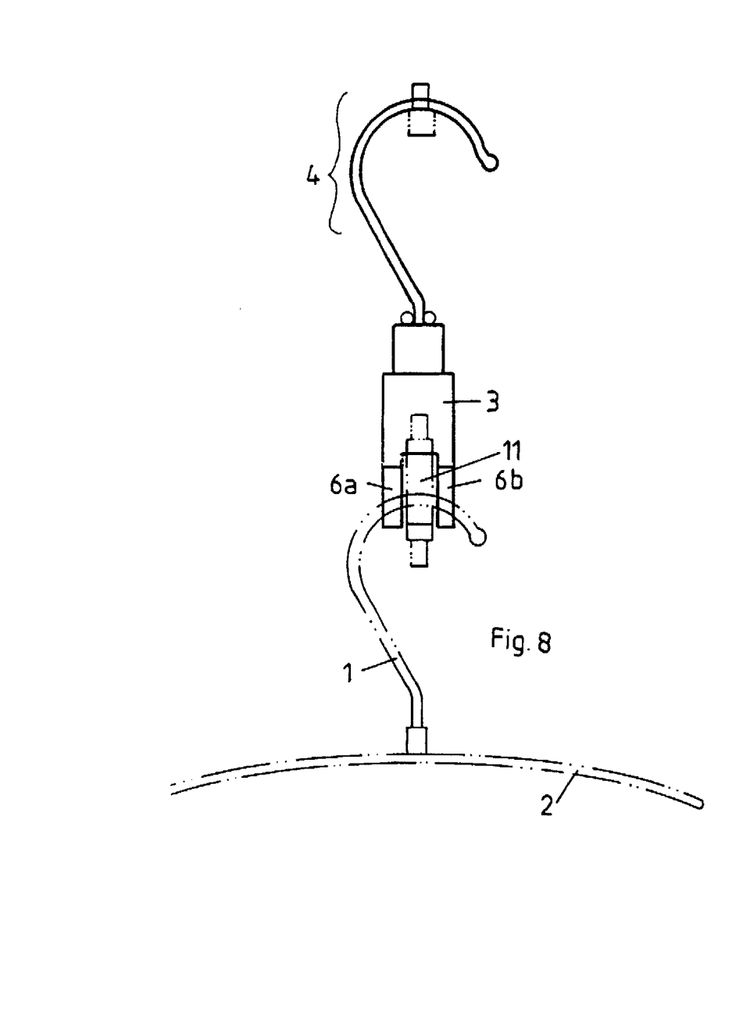
FIG. 8 is a side view of FIG. 7.

FIGS. 7 and 8 illustrate another method and arrangement for automatic loading of the adapter 3 according to the present invention. The hangers 2 are hung by their hooks 1 on a vertically-rotating conveyor belt 13 with upward-protruding transport teeth 14. The adapters 3 which are to be loaded are transported by a conveyor 15 having teeth 16.

The adapters are transported one by one to a position at the front end of hanger conveyor 13. With the adapter in position at the front end of hanger conveyor 13, the hanger hook 1 slides on the end of belt 13 and drops into the receiving region 5 of the adapter 3, as shown most clearly in FIG. 7. For guidance, the stem 18 of the hook 1 of the adapter 3 is moved between two guide ledges 17a, 17b so as to prevent swinging of the adapter 3 during the loading.

Figure 9:
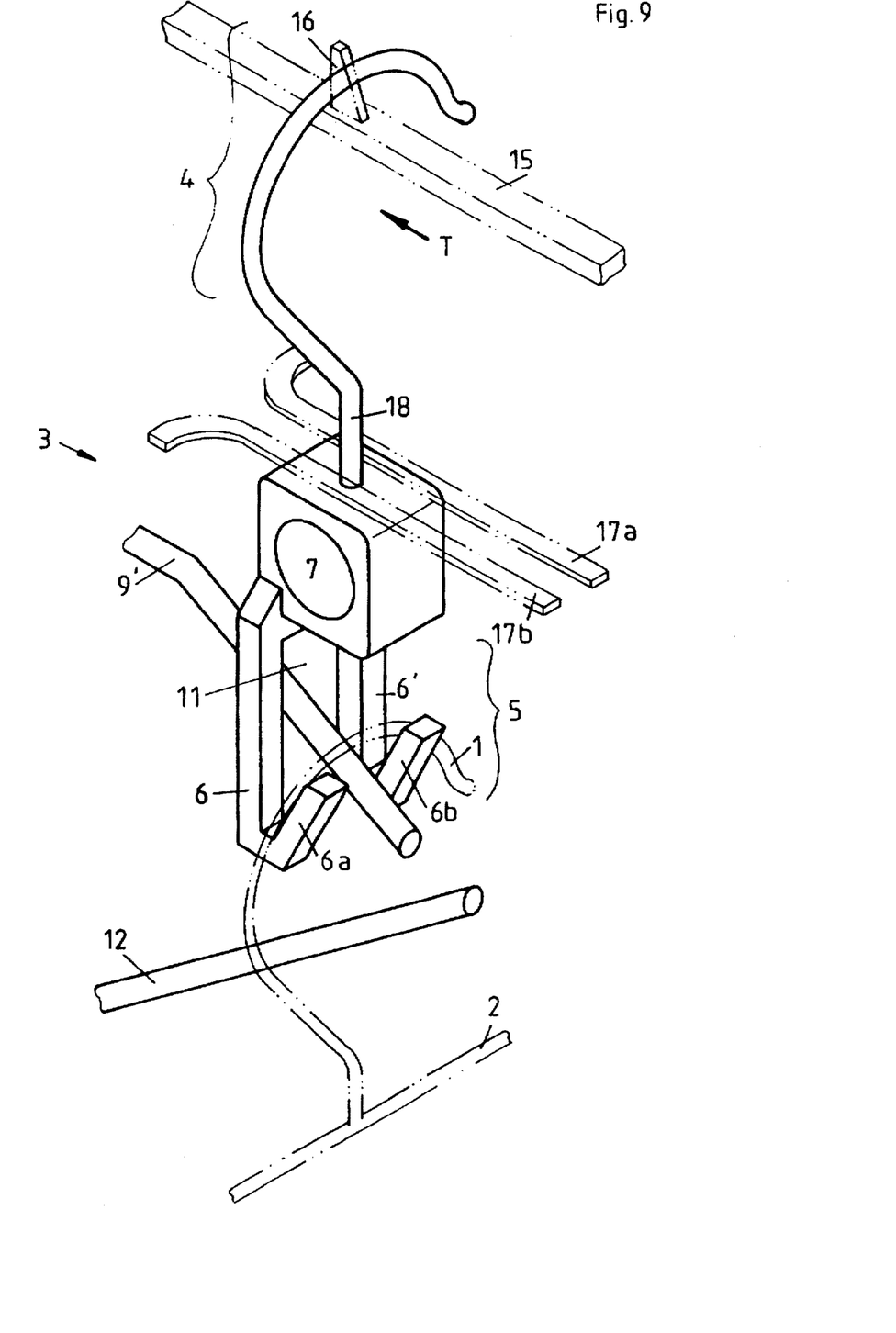
FIG. 9 shows an embodiment of the adapter in the final loading phase according to the present invention.

FIG. 9 illustrates another embodiment of the adapter 3 during an unloading phase according an embodiment of the present invention. Adapter 3, with hanger 2 hanging from it, is guided over a removal rod 9' which ascends in the transport direction T. Removal rod 9' passes through the intermediate space 11. The horizontal position of adapter 3 remains unchanged. Consequently, the hanger hook 1 slides up removal rod 9' and is lifted out of the receiving region 5. Hanger hook 1 clears the ends of arms 6a, 6b, as the adapter continues along the transport direction T. The hanger hook slides downward along removal rod 9' in the direction (–T) opposite the direction of transport T. At the end of removal rod 9', hanger hook 1 drops onto a slide bar 12 which slopes downward and along which the hanger 2 then slides. In this case also, the stem 18 of the adapter 3 is brought between two guide ledges 17a, 17b so as to prevent lateral swinging or twisting during the unloading phase.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. An adapter for use with a hanging conveyor system in which articles hanging on hangers are transported by means of a conveyor along a transport path, the adapter being adapted, to be inserted loosely between each article hanger provided with a hanger hook and the conveyor, the adapter comprising:

a hook-shaped head region; and a receiving region connected with the head region, the receiving region being located below the head region and having at least two sections spaced apart, at least one section with a U-shaped cross section formed by an upward-extending arm for receiving the hanger hook.

2. An adapter according to claim 1, wherein an upper end of the arm of the at least one section descends laterally toward an outside of the adapter.

3. An adapter according to claim 1, wherein a shape of the head region is substantially identical to a shape of the hanger hook.

4. An adapter according to claim 1, further comprising a code element disposed on the adapter, the code element including an identification code.

5. An adapter according to claim 4, wherein the code element is disposed permanently on the adapter.

6. An adapter according to claim 1, wherein the hook-shaped head is adapted to be removably received on the conveyor.

7. An adapter according to claim 1, further comprising a hanger received in the receiving region of the adapter.

8. An adapter according to claim 7, wherein the hanger has a diameter, and the U-shaped opening has an opening distance, the diameter of the hanger and the U-shaped opening distance being substantially equal.

9. An adapter for use with a hanging conveyor system, the adapter comprising:

a hook-shaped head region; and a receiving region connected with the head region, the receiving region being located below the head region and having at least two sections spaced apart, the two sections being spaced apart by a distance sufficient to prevent twisting of a hanger received in the adapter with respect to the adapter, at least one section having a U-shaped cross section formed by an upward-extending arm for receiving a hanger hook.

10. An adapter for use with a hanging conveyor system, the adapter comprising:

a hook-shaped head region; and a receiving region connected with the head region, the receiving region being located below the head region and having at least one section with a U-shaped cross section formed by an upward-extending arm for loosely receiving the hanger hook, an upper end of the arm descending laterally toward an outside of the adapter.

11. A method for automatic loading of a hanger having a hanger hook in an adapter for use with a hanging conveyor system in which articles hanging on hangers are transported by means of a conveyor along a transport path, the adapter hanging on the conveyor and having a receiving region having two sections, each section having a U-shaped cross section formed by an upward-extending arm for receiving the hanger hook, the two sections being spaced apart, the method comprising the steps of:

providing the hanger hook on an upper surface of a feed rod, the hanger hook having a front and a rear;

moving the adapter over the feed rod from the rear of the hanger hook;

bringing the adapter against the hanger hook such that the feed rod is positioned between the two spaced apart sections and the two sections extend down over the feed rod such that the arms point in the direction of the hanger hook and are in a plane below the feed rod; and pushing the hanger off an end of the feed rod, whereby the hanger hook drops into the receiving region as a result of gravity.

12. A method according to claim 11, further comprising the step of introducing a stem of the adapter between two substantially parallel guide ledges, a distance between the guide ledges being slightly greater than the diameter of the stem.

13. A method for automatic removal of a hanger from a receiving region of an adapter for use with a hanging conveyor system in which articles hanging on hangers are transported by means of a conveyor along a transport path, the adapter hanging on the conveyor and having a receiving region having two sections, each section having a U-shaped cross section formed by an upward-extending arm for receiving the hanger hook, the two sections being spaced apart, the method comprising the steps of:

conveying the adapter with the hanger in the receiving region in a transport direction, the arms of the receiving region facing in a. transport direction toward a front of the adapter;

guiding the adapter and hanger in the transport direction over a removal rod substantially parallel to the transport direction, such that the rod is positioned between the spaced sections of the receiving region; and guiding the adapter, while retaining a horizontal position of the adapter, along an ascending portion of the removal rod such that the ascending portion of the removal rod lifts the hanger hook from below over the arms of the spaced sections, whereby contact between the hanger hook and the receiving region is interrupted and the hanger hook is lifted out in the transport direction above the arms.

14. A method according to claim 13, further comprising the step of pushing the hanger hook forward with the receiving region to a descending portion of the removal rod such that the hook slides down the descending portion of the removal rod as a result of gravity.

15. A method according to claim 13, further comprising the step of introducing a stem of the adapter between two substantially parallel guide ledges, a distance between the guide ledges being slightly greater than the diameter of the stem.

16. A method for the automatic removal of a hanger from the receiving region of an adapter for use with a hanging conveyor system in, which articles hanging on hangers are transported by means of a conveyor along a transport path, the adapter hanging on the conveyor and having a receiving region having two sections, each section having a U-shaped cross section formed by an upward-extending arm for receiving the hanger hook, the two sections being spaced apart, the method comprising the steps of:

conveying the adapter with the hanger hanging from it in a transport direction and with the arms towards a back of the adapter with respect to the transport direction;

guiding the adapter over a removal rod, the removal rod being substantially parallel to the transport direction and ascending in the transport direction, such that the rod is located between the adjacent sections, the adapter, while retaining its horizontal position, is guided along the removal rod until the rod lifts the hanger hook from below over the arms of the sections, whereby contact between the hanger hook and the receiving region is interrupted and the hanger hook is lifted out above the arms and slides, opposite the transport direction, down along the removal rod.

17. A method according to claim 16, further comprising the step of introducing a stem of the adapter between two substantially parallel guide ledges, a distance between the guide ledges being slightly greater than the diameter of the stem.

18. An adapter for use with a hanging conveyor system in which articles hanging on hangers are transported by means of a conveyor along a transport path, the adapter being adapted to be inserted loosely between each article hanger provided with a hanger hook and the conveyor, the adapter comprising:

a hook-shaped head region; and a receiving region connected with the head region, the receiving region being located below the head region and having at least one section with a U-shaped cross section formed by an upward-extending arm for receiving the hanger hook, an upper end of the arm descending laterally toward an outside of the adapter.

19. An adapter according to claim 18, wherein the receiving region comprises at least two sections spaced apart.

20. An adapter according to claim 19, wherein the two sections are spaced apart by a distance sufficient to prevent twisting of a hanger received in the adapter with respect to the adapter.

21. An adapter according to claim 18, wherein a shape of the head region is substantially identical to a shape of the hanger hook.

22. An adapter according to claim 18, further comprising a code element disposed on the adapter, the code element including an identification code.

23. An adapter according to claim 22, wherein the code element is disposed permanently on the adapter.

24. An adapter according to claim 18, wherein the hook-shaped head is adapted to be removably received on the conveyor.

25. An adapter according to claim 18, further comprising a hanger received in the receiving region of the adapter.

26. An adapter according to claim 25, wherein the hanger has a diameter, and the U-shaped opening has an opening distance, the diameter of the hanger and the U-shaped opening distance being substantially equal.

27. An adapter for use with a hanging conveyor system in which articles hanging on hangers are transported by means of a conveyor along a transport path, the adapter being adapted to be inserted loosely between each article hanger provided with a hanger hook and the conveyor, the adapter comprising:

a hook-shaped head region; and a receiving region connected with the head region, the receiving region being located below the head region and having at least two sections spaced apart by a distance sufficient to prevent twisting of a hanger received in the adapter with respect to the adapter, at least one section with a U-shaped cross section formed by an upward-extending arm for receiving the hanger hook.

28. An adapter according to claim 27, wherein a shape of the head region is substantially identical to a shape of the hanger hook.

29. An adapter according to claim 27, further comprising a code element disposed on the adapter, the code element including an identification code.

30. An adapter according to claim 29, wherein the code element is disposed permanently on the adapter.

31. An adapter according to claim 27, wherein the hook-shaped head is adapted to be removably received on the conveyor.

32. An adapter according to claim 27, further comprising a hanger received in the receiving region of the adapter.

33. An adapter according to claim 32, wherein the hanger has a diameter, and the U-shaped opening has an opening distance, the diameter of the hanger and the U-shaped opening distance being substantially equal.

* * * * *